(12) United States Patent
Furtwangler et al.

(10) Patent No.: US 10,031,960 B2
(45) Date of Patent: Jul. 24, 2018

(54) ASYNCHRONOUS MODELS

(71) Applicant: Home Box Office, Inc., New York, NY (US)

(72) Inventors: Steven N. Furtwangler, Okemos, MI (US); Tyler R. Furtwangler, Sammamish, WA (US); Brandon C. Furtwangler, Issaquah, WA (US); J. Jordan C. Parker, Seattle, WA (US)

(73) Assignee: HOME BOX OFFICE, INC., New York, NY (US)

( * ) Notice: Subject to any disclaimer, the term of this patent is extended or adjusted under 35 U.S.C. 154(b) by 337 days.

(21) Appl. No.: 14/843,792

(22) Filed: Sep. 2, 2015

(65) Prior Publication Data

US 2016/0070773 A1 Mar. 10, 2016

Related U.S. Application Data

(60) Provisional application No. 62/046,109, filed on Sep. 4, 2014.

(51) Int. Cl.
*G06F 17/30* (2006.01)
*G06F 9/451* (2018.01)
*G06F 9/44* (2018.01)

(52) U.S. Cl.
CPC ...... *G06F 17/30578* (2013.01); *G06F 9/4443* (2013.01); *G06F 9/451* (2018.02); *G06F 17/30572* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,615,199 B1 * | 9/2003 | Bowman-Amuah | ... | G06F 9/449 706/50 |
| 2004/0254842 A1 * | 12/2004 | Kirkegaard | .......... | G06Q 10/063 705/22 |
| 2007/0255833 A1 * | 11/2007 | Sharma | ................... | H04L 67/32 709/226 |

OTHER PUBLICATIONS

Colombian Office Action for Colombian Application Serial No. NC2017/0003239 dated Apr. 11, 2017, 6 pages (with English translation).
International Search Report and Written Opinion from International Patent Application Serial No. PCT/US15/48418, dated Dec. 2, 2015, 13 pages.

(Continued)

*Primary Examiner* — Shyue Jiunn Hwa
(74) *Attorney, Agent, or Firm* — Amin, Turocy & Watson, LLP

(57) ABSTRACT

The described technology is directed towards asynchronous models that retrieve view-specified data for a view. A view requests a view model to return view-specified data; in turn, the view model makes one or more requests to a data model to retrieve information corresponding to the view-specified data. The data model communicates with a data source such as a web service or a cache to return the requested information to the view model. The view model may assemble/reformat the information into a data format corresponding to the view specified data format for returning to the view. The requests may be asynchronous, with a promise returned in response until the data or information is returned to fulfill the promise.

20 Claims, 11 Drawing Sheets

(56) References Cited

OTHER PUBLICATIONS

G.C. Juan Pablo: "Async MVVM Modem UI—CodeProject," URL:http://www.codeproject.com/Articles/441752/Async-MVVM-Modem-UI, Aug. 16, 2012, 10 pages.
Martin Fowler: "JavascriptPromise," URL:http://martinfowler.com/bliki/JavascriptPromise.html, Apr. 22, 2013, 1 page.
Trevor Burnham: "Wrangle Async Tasks With JQuery Promises," URL:http://code.tutsplus.com/tutorials/wrangle-async-tasks-with-jquerypromises—net-24135, Feb. 22, 2012, 8 pages.
Florian Rappl: "Asynchronous models and patterns—CodeProject," URL:http://www.codeproject.com/Articles/562021/Asynchronous-modelsand-patterns, Mar. 28, 2013, 34 pages.

\* cited by examiner

ASYNCHRONOUS MODELS

CROSS-REFERENCE TO RELATED APPLICATION

The present application claims priority to U.S. provisional patent application Ser. No. 62/046,109, filed Sep. 4, 2014, the entirety of which is incorporated herein by reference.

BACKGROUND

In object-oriented programming, the Model-View-Controller (MVC) pattern is a software architectural pattern that divides an application program into model, view and controller component parts. This creates a separation between the internal representation of the data and the way that the data is presented to the user (or input accepted from the user).

The model component is the internal representation of the data, that is, an object representing some data. The view component is an object that provides a representation of that data to the user, that is, the view may be considered a visualization of the state of the model. The controller component object accepts input from the user and, for example, allows changing the state of the model.

While the traditional MVC pattern works well for many types of application programs, there are problems with it when the data that a model and/or view needs are not readily available. For example, sometimes data needs to be retrieved from a network source, whereby models and views need to wait for the data.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, the technology described herein is directed towards receiving, at a view model, a view-specified data request from a view, and at the view model, making one or more asynchronous requests to a data model for information corresponding to the view-specified data request. A promise is returned from the view model to the view in response to the view-specified data request. The data model obtains a dataset including the information and provides the information to the view model in response to the one or more asynchronous requests. The view model returns the view-specified data, based upon the information, to the view to fulfill the promise.

Other advantages may become apparent from the following detailed description when taken in conjunction with the drawings.

BRIEF DESCRIPTION OF THE DRAWINGS

The present technology is illustrated by way of example and not limited in the accompanying figures in which like reference numerals indicate similar elements and in which.

DETAILED DESCRIPTION

Figure 1:
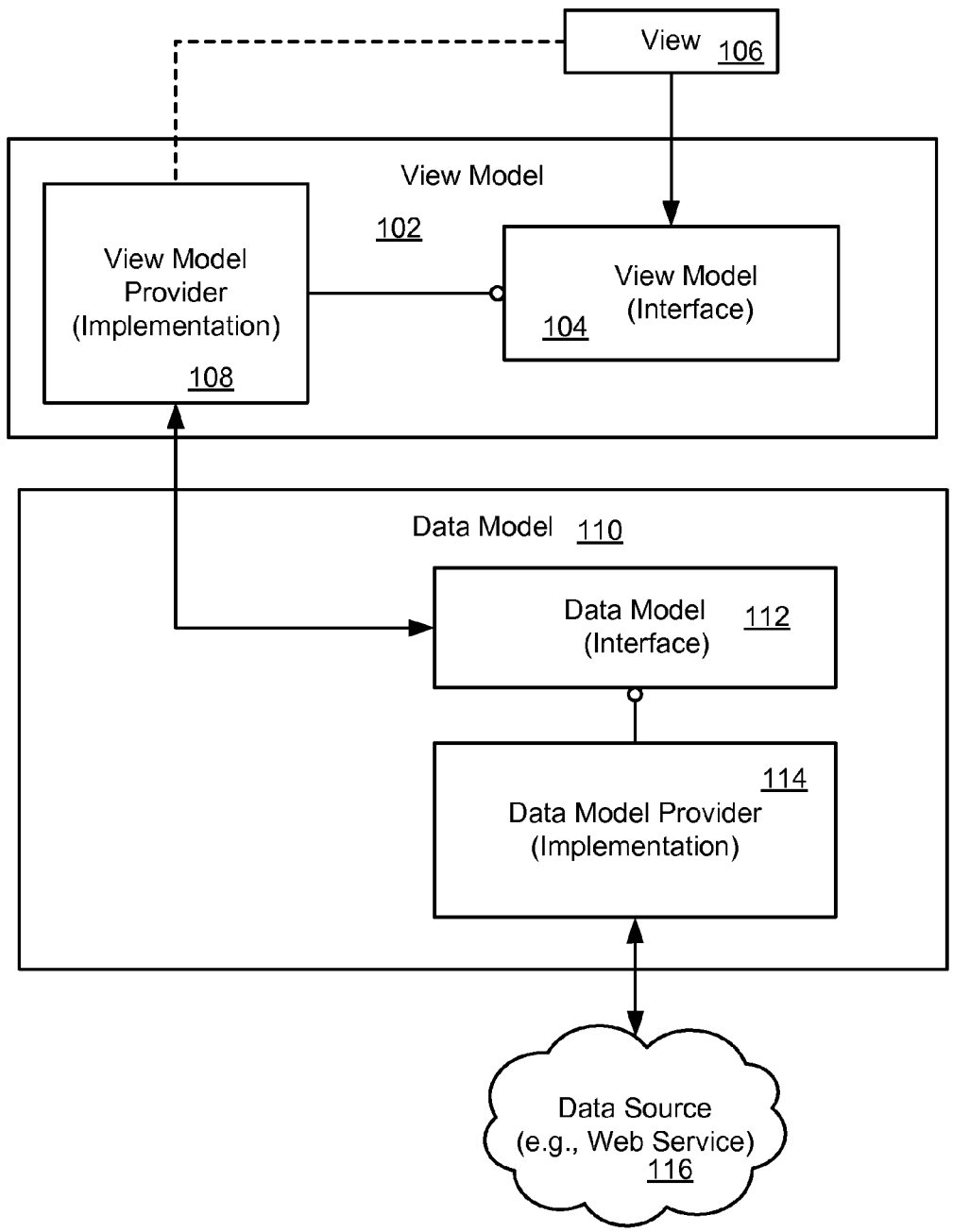
FIG. 1 is a block diagram showing an example configuration of components (including view and asynchronous model objects) that may be used to return view-specified data to a requesting view, according to one or more example implementations.

The technology described herein is directed towards having models that are populated with data asynchronously. Via the technology described herein, a model may be initially created with all, none, or some of its data, while user interfaced (UI) elements comprising view components can be created that depend on data that an application program does not yet have. If a model is lacking the data, the model contains the logic to fetch the missing data, e.g., from another intermediate model or from a remote data source such as a server hosting the data for a client. To this end, when the data is not yet available, a response comprising a "promise" or the like (sometimes referred to as a "future" or "delay" in asynchronous programming environments) may be returned, e.g., created as an object. Note that as used herein, "promise" is a generic term representing any such response, and for example may be related to, but is not limited to, a JavaScript® Promise. As also used herein, a promise is "fulfilled" when the corresponding data is returned (sometimes referred to as "resolving" or "binding"

the promise in asynchronous programming environments). A promise may be rejected in the event of an error.

The model and view separation provided by the technology allows other parts of the code, such as the views in the user interface, to interact with the models asynchronously without knowing the details of how the data will be fetched, or how it will be stored locally, and allows the views to be updated when the data becomes available in the future.

Models, in this system, may comprise model interfaces defining the data that the model is capable of resolving. The model defines the shape of the data used by the application, and defines what the data is, but not where the data comes from. Data providers are implementations associated with the model interfaces, which contain the code needed to fill in the interface by performing needed operation(s), asynchronously.

Data providers may have to perform some translation between the form of the data in the data source, and the form defined by the model interface. When data is requested from a model, the underlying provider may return cached data if available or instead make the necessary service requests to retrieve the data. Data providers know where the needed data is, and how to get that data.

As part of performing the asynchronous service request to get a piece of requested data, a provider may receive a response containing additional data that may be used by its interface. The provider makes these requests only when needed, and may cache additional data when resolving a request to reduce the number of times that the client has to fetch data from a remote (networked) data source.

The technology described herein makes use of this asynchronous pattern at separate layers of the application. At the service (data) layer, data model interfaces and data providers define what the data on which the client application will operate looks like, and where to go to get that data, (e.g., which remote services to hit, and how to translate their responses). At the UI view (design) layer, views define the UI elements and have their own view models. These "view models" define the data that a particular view needs or operates on. These view models have interfaces and their own providers, "view model providers," which understand where to get this information from the data layer of the application (e.g., which "data models" a view model needs to request data from and reformat and/or combine in order to aggregate the needed data).

In general, these properties and operations are asynchronous, because fetching data from an external source (network database, web service and so forth) can be a slow operation which would otherwise hold up the creation of the item that needs the data. With asynchronous data fetch operations, a UI view object (or simply a "view") can be created with the information the view needs to fetch the data that the view intends to display to the user, and the view is updated when that data becomes available. The identifier "ID" property on these objects is not asynchronous, however, because the ID property is needed to create the object. The ID property is meant to contain the data needed to uniquely identify the object and to fetch the necessary data, when requested. This property is thus not asynchronous, because a slow operation otherwise may hold up the creation of the object until the service or the like that provides the rest of the data has been contacted.

Providers, which are responsible for getting the data (by making a request to some external source and typically parsing the result), can also cache results by holding onto other data that comes back in the same request, for example, whereby asking for multiple properties often does not require multiple requests to the networked data source. For example, when a UserModel interface is asked for the name of a user with a given ID, the UserProvider may contact a service that returns the information about the requested User (name, address, phone number, etc). If that data is cached locally, then a view (or number of views) that end up requesting different properties from the same provider (or the same property, more than once) do not cause additional slow requests to be made to re-fetch the already fetched data. The data is still returned asynchronously so that the object using the model does not need to know whether the provider needed to make a network (generally slow) request or whether the provider already had the data locally cached.

The asynchronous pattern described herein is useful for a number of reasons, including that the pattern decouples what the data should be from how the application gets the data. When updating to a new data format or new remote services, the provider may have to be updated (or a new one implemented) but no other entity that uses the model is affected or needs to be updated.

Further, model interfaces provide another useful abstraction. For example, a MenuModel may be a generic interface defining a model that can provide a Title and a collection of Items. This interface may be implemented by both a Navigation Menu Provider (which knows how to get the navigation menu for an application) and a SettingsMenuProvider (which knows how to build up a list of the settings that can be customized in an application). ViewModelProviders that operate on MenuModel data can work with the data for both of these kinds of menus, without knowing which one it is (or how the data is obtained when it is needed).

Similarly, a view model interface may be implemented by more than one view model provider. For example, a MenuItemView (responsible for displaying a menu item to a user) may operate on a MenuItemViewModel. MenuItemViewModel may be an interface implemented by two (or more) view model providers (e.g., one for displaying a menu item that links to another submenu, and one that links to an asset at the leaf-node of a menu tree). Although the shape of the data is very different (e.g., MenuModel and AssetModel may not have any fields in common), the view model providers that implement the MenuItemViewModel interfaces each know how to take one of these models and map the data to the form that the MenuItemView expects.

The view/view model separation is also useful because views may be data driven. View models represent what data needs to be visualized by the view. Separating views from view models facilitates reusing components by changing the underlying view model, rather than replacing the whole view.

The asynchronous model interfaces allow for objects to be created and data to be bound before it has become available. The consumer of the data need not care (or know) how the data will be requested/calculated. This pattern maintains responsiveness in application while slow network requests complete.

It should be understood that any of the examples herein are non-limiting. For instance, although certain types of models and views are exemplified herein, the technology is able to work with other types of models and views. As such, the technology described herein is not limited to any particular embodiments, aspects, concepts, structures, functionalities or examples described herein. Rather, any of the embodiments, aspects, concepts, structures, functionalities or examples described herein are non-limiting, and the present technology may be used in various ways that provide benefits and advantages in computing, application programs and user interface technology using models and views in general.

In general, for purposes of brevity and simplicity, as used herein a "model" ordinarily refers to the model interface in conjunction with its associated implementation, which is the model provider. Thus, for example, as used herein a view may communicate with a "view model" (that is, via the view model interface), and in turn the view model (e.g., via its provider code) may communicate with a data model (that is, via the data model interface). Note that as can be understood by its context, in some situations, a "model" may refer to an object interface to a provider implementation that implements the interface and performs the main work of that object.

FIG. 1 is a block diagram showing various example components directed towards asynchronous models. In one or more implementations, a view model 102 comprises an interface 104 that defines the shape of the data used by a view, such as the view 106. A view model provider 108 is an implementation of the view model 102 that implements the view model interface 104. Note that in general, the view model 102 basically specifies what data is needed by its associated view, but does not care about the source of the data. Instead, a data model 110 is used to obtain the data.

The data model 110 includes a data model interface 112 and data model provider 114 comprising an implementation of the data model 110 (the data model provider 114 implements the data model interface 112) that knows how to obtain the data from a data source, such as the web service 116. A view model 102 is thus different from a (data) model 110 in that the corresponding view 104 defines the data shape needed by the view, whereas services (such as the service 112) typically determine the shape of a data model 110.

Figure 2A:
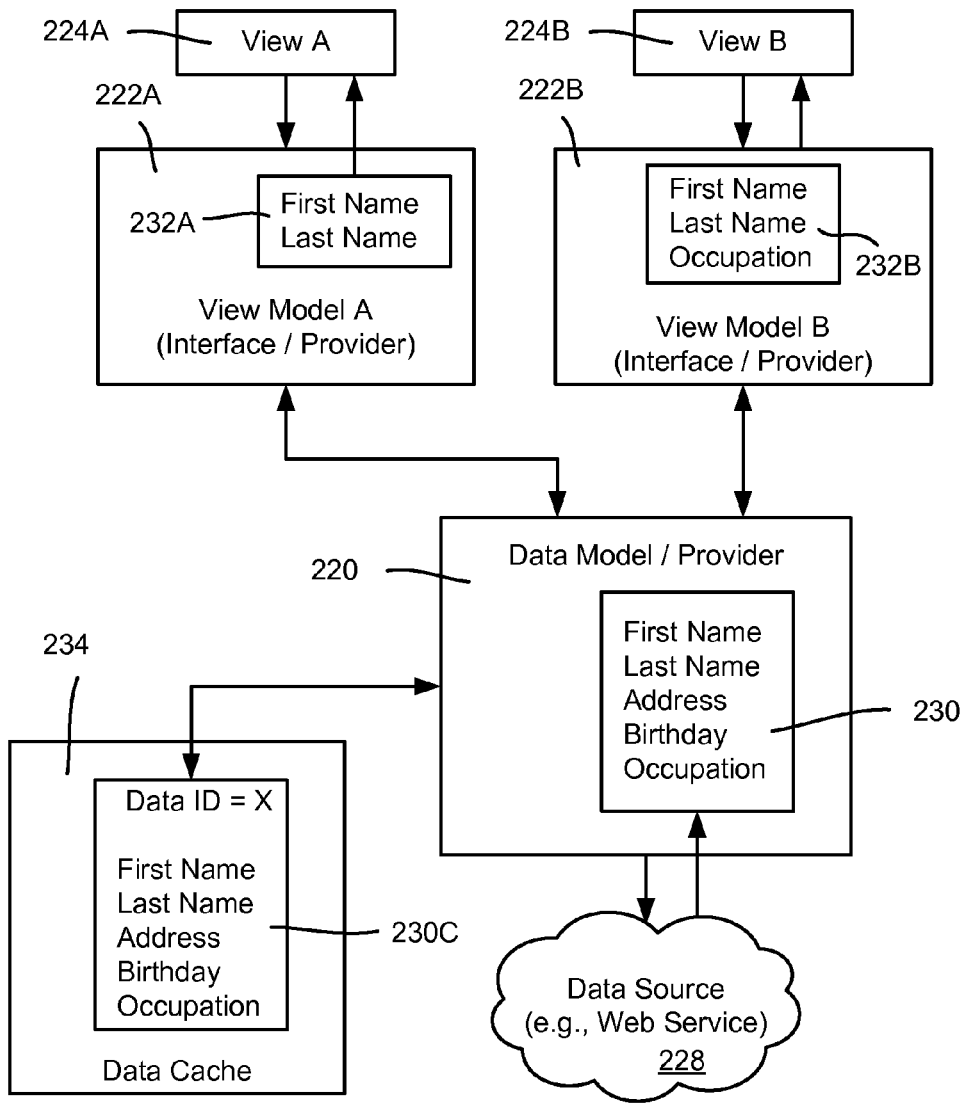
FIG. 2A is a block diagram showing an example configuration of components in which two view models request and obtain information from the same data model, according to one or more example implementations.

By way of example, as generally represented in FIG. 2A, for the same data model 220 (including the interface and data provider), there may be (e.g., two) different view models (including interfaces and view providers) 222A and 222B for (e.g., two) different views 224A and 224B, respectively that are each bound to the same data model 220. Each of the view models 222A and 222B acts as the "glue"/ binding between each of the views 222A and 222B and the data model 220, including adapting the model data as needed to the format each view 224A and 224B specifies.

In the example of FIG. 2A, the view 224A requests the first name and last name for some person, whereas the view 224B requests (not necessarily at the same time) the first name, last name and occupation of that person. Note that the views 224A and 224B may not be that specific in their view-specified data requests for the needed data; e.g., the view 224A may simply request the "name" of a person, with the view model 222A knowing that what the view 224A really wants is the first name and the last name.

As described herein, the view models 226A and 226B (e.g., their providers) may break up data requests into smaller asynchronous requests, e.g., first name and then last name for the view model 226A, and first name, then last name, then occupation for the view model 226B. It is alternatively feasible for a view to break up its own requests. This may be done for a number of reasons, including that a request for view-specified data may need data from two (or more) data models, because smaller asynchronous requests may be desirable (a request for a large amount of data at once may be less desirable than many small requests for that same data), and/or because a data model may be designed to handle time (or operate more efficiently with) only one request/response at a time (or some small number of requests/responses at a time).

The data model 220 knows via its provider implementation how to obtain (at least) this information from an appropriate data source such as a web service 228, and in this example fetches a dataset 230 comprising first name, last name, address, birthday and occupation of the person. The view models 222A and 222B via their respective view providers each format the information into corresponding data as needed, e.g., into the appropriate respective subsets 232A and 232B of the dataset 230 for use by the respective views 224A and 224B. At this time the views 224A and 224B may use the data as desired, e.g., to visualize the data according to an appropriate style, e.g., font, font color, font size and so on, within a display tree that is rendered.

The data model 220 may cache any returned information (in conjunction with an identifier to facilitate retrieval) in a data cache 234, e.g., as cached dataset 230C with a cache-unique identifier X; (subsets may be cached instead of or in addition to a larger dataset). Caching serves a number of purposes, including to cache excess data in anticipation of future use. For example, the first name and last name are both likely to be requested, which may occur in separate requests from the same view model, as with the view model 222A, and thus caching both together even if only the first name is initially requested saves going back to the network for the next separate request. Similarly, caching allows for reuse by another requesting entity; for example, if the view 224B (via its view model 222B) makes request(s) for the first name, last name and occupation at a later time than did the view 224A (via its view model 222A), the data model 220 can access the information from the data cache 234 instead of again going to the (typically far slower) web service 228 to again retrieve the requested information. It should be noted that a view model/view model provider also may have a view cache; e.g., a tile view comprising text combined with an image may be cached so that the view need not be recreated and rebuilt each time the same tile view instance is needed, even if the text and image data are each cached at the data layer.

Thus, having the view model and data model separation provides a number of benefits, including the ability to have multiple different view models coupled to the same data model, and/or to have the separate view and data layers, which allows simply changing a data model as needed (e.g., to work with a new data source) without impacting the view layer, and/or using a new view model for some new view without impacting the data layer. It should be noted, however, that it is feasible to sometimes have combined view model/data model structure and functionality, e.g., a single model object (or even have the provider(s) built into the view), such as for situations in which a view accesses data that no other view/view model will ever need.

Figure 2B:
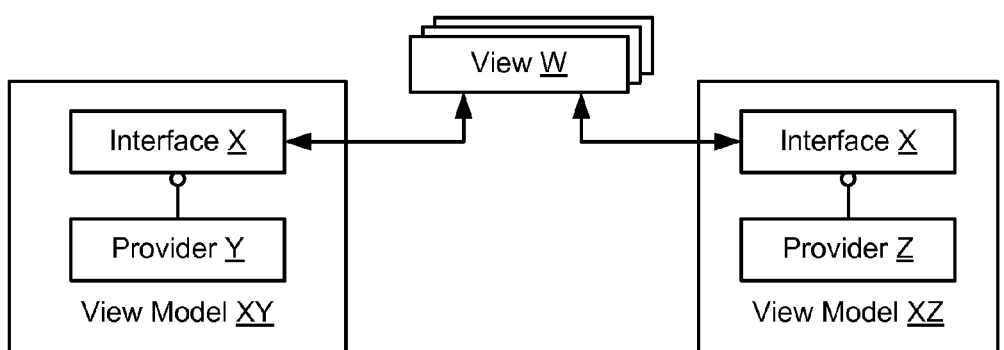
FIG. 2B is a block diagram showing an example configuration of components in which a view (or multiple views) communicate with different view models in which each view model has the same interface implemented by different provider implementation, according to one or more example implementations.

In addition to having multiple view models communicate with the same data model, two or view models may have different providers that implement the same view model interface, as generally exemplified in FIG. 2B. For example a view W (as well as possibly other views) communicates with a view model XY having a view model interface X implemented by a view model provider Y. The view W also communicates with a view model XZ having the view model interface X implemented by a different view model provider Z. The view W only needs to interface with (e.g., a generic) interface X yet may obtain different data from different view model providers.

Figure 3:
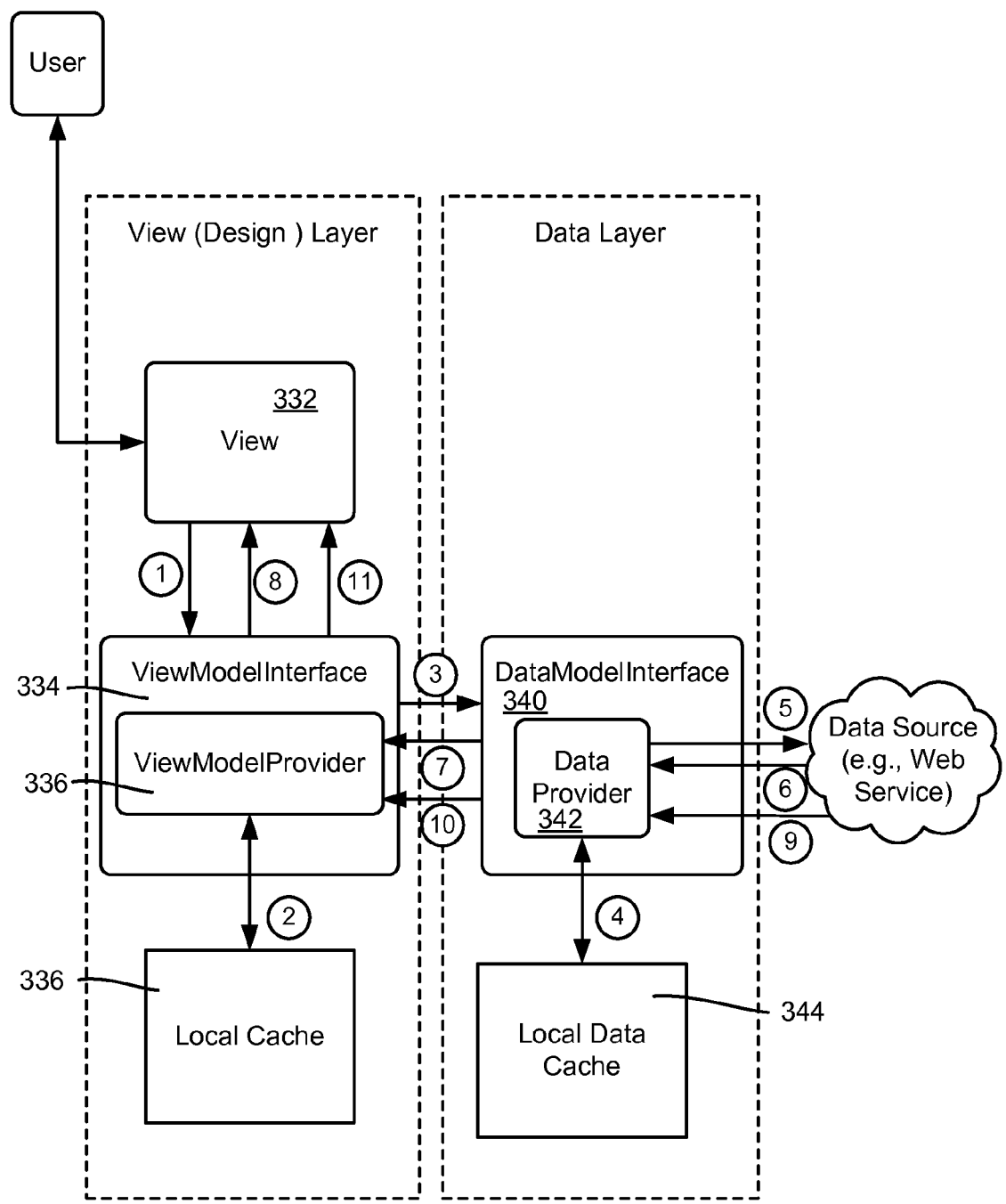
FIG. 3 is a block diagram showing an example sequence of data requests and responses including promises for asynchronous requests, according to one or more example implementations.

FIG. 3 summarizes the asynchronous aspects of the process for a single view 332 in various operations (requests and responses) shown via labeled arrows. When a view 332 has a view model (interface 334 and provider 336) with data that changes (or with data that is initially set), the view 332 needs to build its display tree node(s) based on the data in the view model. The view 332 does this by asynchronously asking the view model interface 334 for the data, as represented by the arrow labeled one (1). As described above, the view model interface 334 is implemented by the view model provider 336.

For certain view instances, it is feasible for the view model provider 336 to have the view's data cached in a local view cache 338, and if so, checks the local view cache 338 (arrow two (2)). In this example consider that the view data is not cached, whereby the view model provider 336 translates the request into the appropriate request(s) on the (data) model interface 340 (arrow three (3)) with which it was created (e.g., by a model factory as generally described below with reference to FIG. 5). For example, if the view 332 needs data called "text", the view model provider 336 may know to ask the appropriate model interface 340 for more specific text such as "title" instead of requesting text in general. This may be done because the data model understands the term "title" in its data model request format, and indeed, may not understand "text" as it may be designed to differentiate between various textual items such as title, rating, cast of characters, movie release date, synopsis, and so on.

The data model interface 340 is implemented by a data provider 342. The data provider 342 may have the data cached in a local data cache 344, and thus check its local data cache 344 (arrow four (4)). In this example the data is not (yet) cached, so the data provider 342 translates the request into an appropriate web request (arrow five (5)). Networking is asynchronous, so the web request returns a promise to the provider 342 (arrow six (6)), which will be fulfilled once the response comes in.

The provider 342 does not yet have the response, only a promise for one, so the provider also creates a promise that will transform the web response into the requested model data, once the networking promise is fulfilled. The data model interface 340 returns this created promise to the view model provider 336 (arrow seven (7)).

The view model provider 336 also does not yet have the model data, only a promise for one, so the view model provider 336 creates a promise that will transform the model data into view model data, once the data model promise is fulfilled. The view model interface 334 returns its promise to the view 332 (arrow eight (8)); note that this may be done before receiving the promise from the data model, or may be done only once if a view's request is broken up into multiple requests for data. The view 332 cannot yet create its display because the view 332 does not have the actual model data, so the view registers a "then" callback or the like (e.g., in a JavaScript® promise statement) to create the view's display when the data comes in. However, the view knows of the promise, and can perform other operations such as make other asynchronous requests while awaiting the data.

Sometime in the future, the web response comes in (arrow nine (9)), and the networking promise is fulfilled. The data provider parses/translates the response into the requested model data/information format, and with this parsed/translated data fulfills the promise it previously returned (arrow ten (10)).

The view model provider 336 is thus notified of the data provider promise fulfillment, and gets the model data. The view model provider 336 translates this back into the requested view-specified model data (e.g. from "title" to "text"), and fulfills the Promise that it previously returned, (e.g., arrow eleven (11)).

The promise that was given to the view 332 is thus fulfilled. The view 332 gets the view model data, and using the data builds one or more nodes of the display tree that is processed for rendering into output for the user to see.

Figure 4:
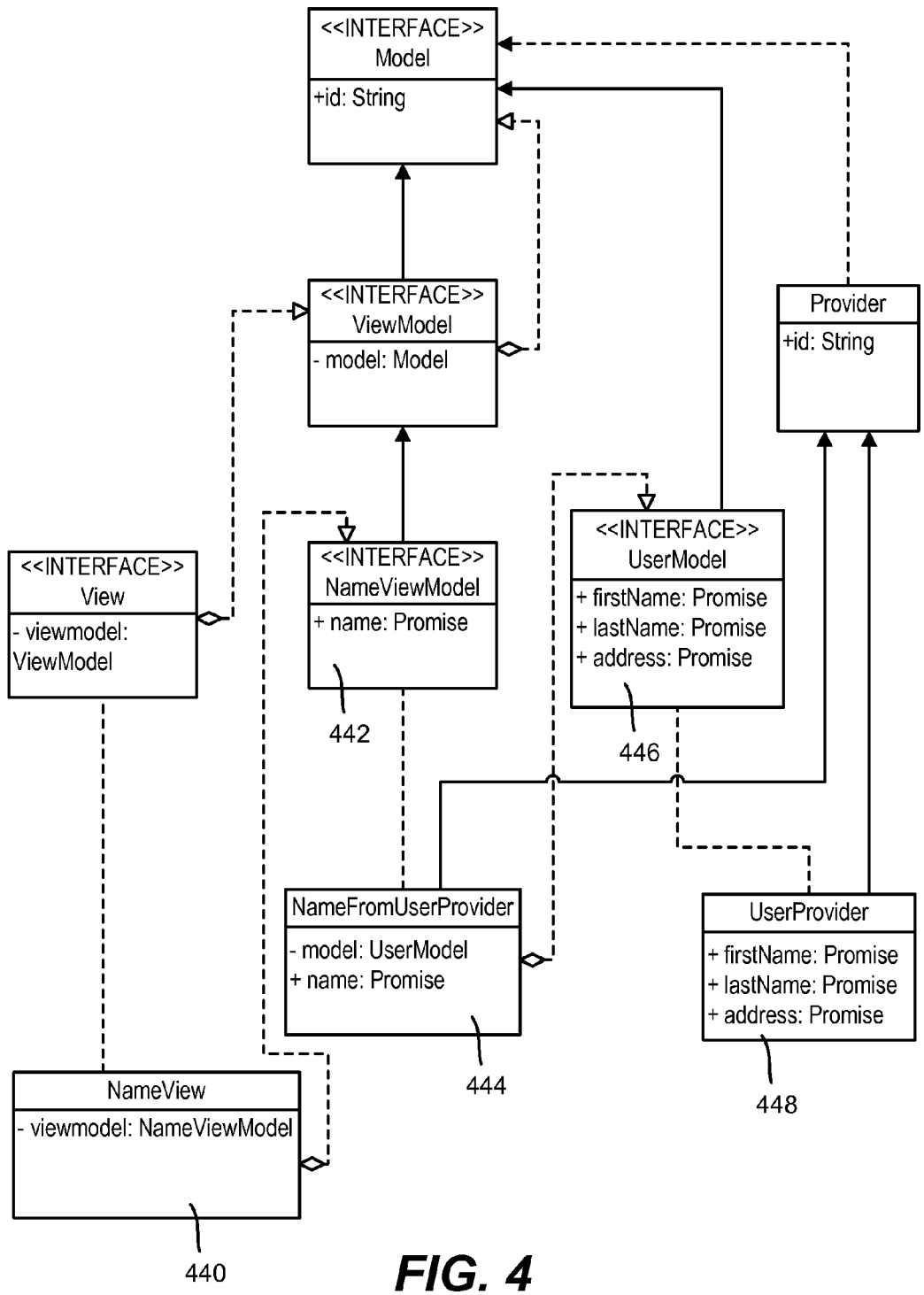
FIG. 4 is an example representation of models including interfaces and providers that are configured to return requested view-specified data to a view, according to one or more example implementations.

Turning to a more specific example, as represented in FIG. 4, consider a view that displays a name (first and last) as a string. This view is called NameView 440, and its view model is a NameViewModel 442. NameViewModel 442 comprises an interface that exposes a "name" property which will return a promise for a string. NameViewModel 442 is implemented by NameFromUserProvider 444, which is a provider whose model is a UserModel 446. UserModel 446 is a model interface that exposes properties for first name and last name. UserProvider 448 implements UserModel 446 and knows how to go to an external data service to get the first name, last name, address, and possibly other information about a user.

Figure 5:
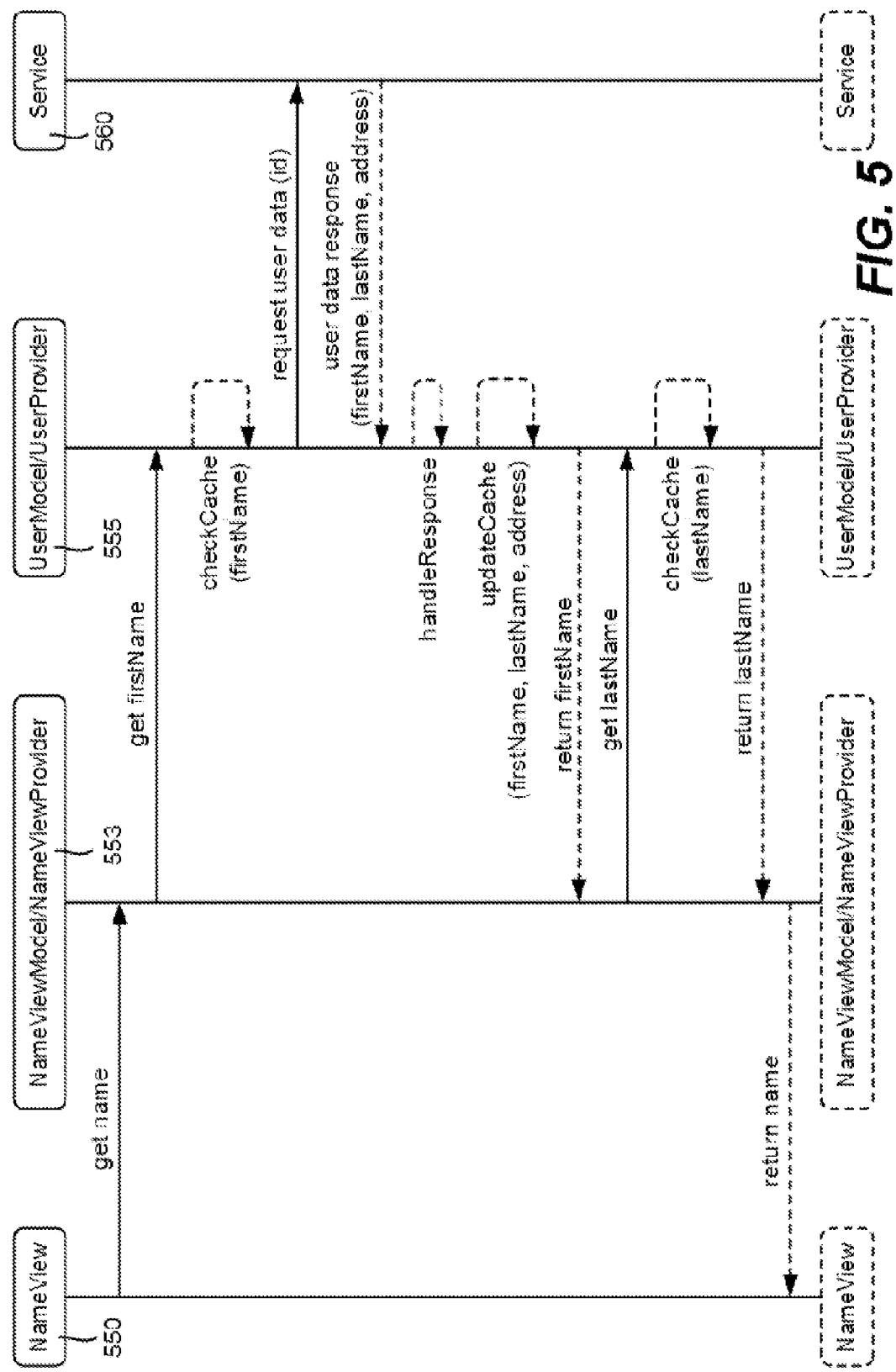
FIG. 5 is a representation of an example sequence/dataflow diagram in which various model components operate to request and receive data to return view-specified data to a view, according to one or more example implementations.

FIG. 5 shows an example sequence dialog including data flow/steps for a view referred to as NameView 550 requesting view-specified data (the data that is needed) for name data ("get name") from its view model (that is, its interface and its provider implementation collectively shown as NameViewModel/NameViewProvider 553), and getting that string back asynchronously. FIG. 5 shows an example where a view model requests multiple properties from a user model.

As can be seen the NameViewModel/NameViewProvider 553 breaks up the request into a plurality of requests, that is, a "get firstName" request and a "get lastName" request in this example. In general, this may be because the provider knows that the corresponding data model expects requests in this format, or to keep requests small, and so on.

The first time data is needed, via a "get firstName" request, the data model (that is, its interface and its provider implementation collectively shown in FIG. 5 as UserModel/UserProvider 555) checks its cache, and determines that the needed data is not cached. The provider implementation of the UserModel/UserProvider 555 thus calls an external service 560 to obtain the data, and the provider implementation handles the response. Although not explicitly shown in FIG. 5, it is understood as described herein that requests are asynchronous in this example, and thus promises are returned as appropriate, e.g., because of the delay in retrieving the data.

In this example, when the data model's request is fulfilled, the response from the service 560 returns a dataset comprising more data than was needed, (firstName, lastName, address). This dataset, or at least part thereof, is cached in the UserModel/UserProvider's cache.

The first name is returned to the NameViewModel/NameViewProvider 553 in response to the get firstName request, whereby the NameViewModel/NameViewProvider 553 then requests the next desired property, the lastName, from the UserModel/UserProvider 555. This time, when the UserModel/UserProvider 555 accesses its cache, the last name data is present, whereby the request need not hit the network (the service need not be contacted), as instead the cached lastName data is returned to the NameViewModel/NameViewProvider 553. At this time, the NameViewModel/NameViewProvider 553 has the desired name property values of firstName and LastName, reassembles the returned information into the "name" data format so that the returned data is in the proper form to satisfy the request for the view-specified data, and returns the name data to the NameView 550 in response to the original get name request.

Figure 6:
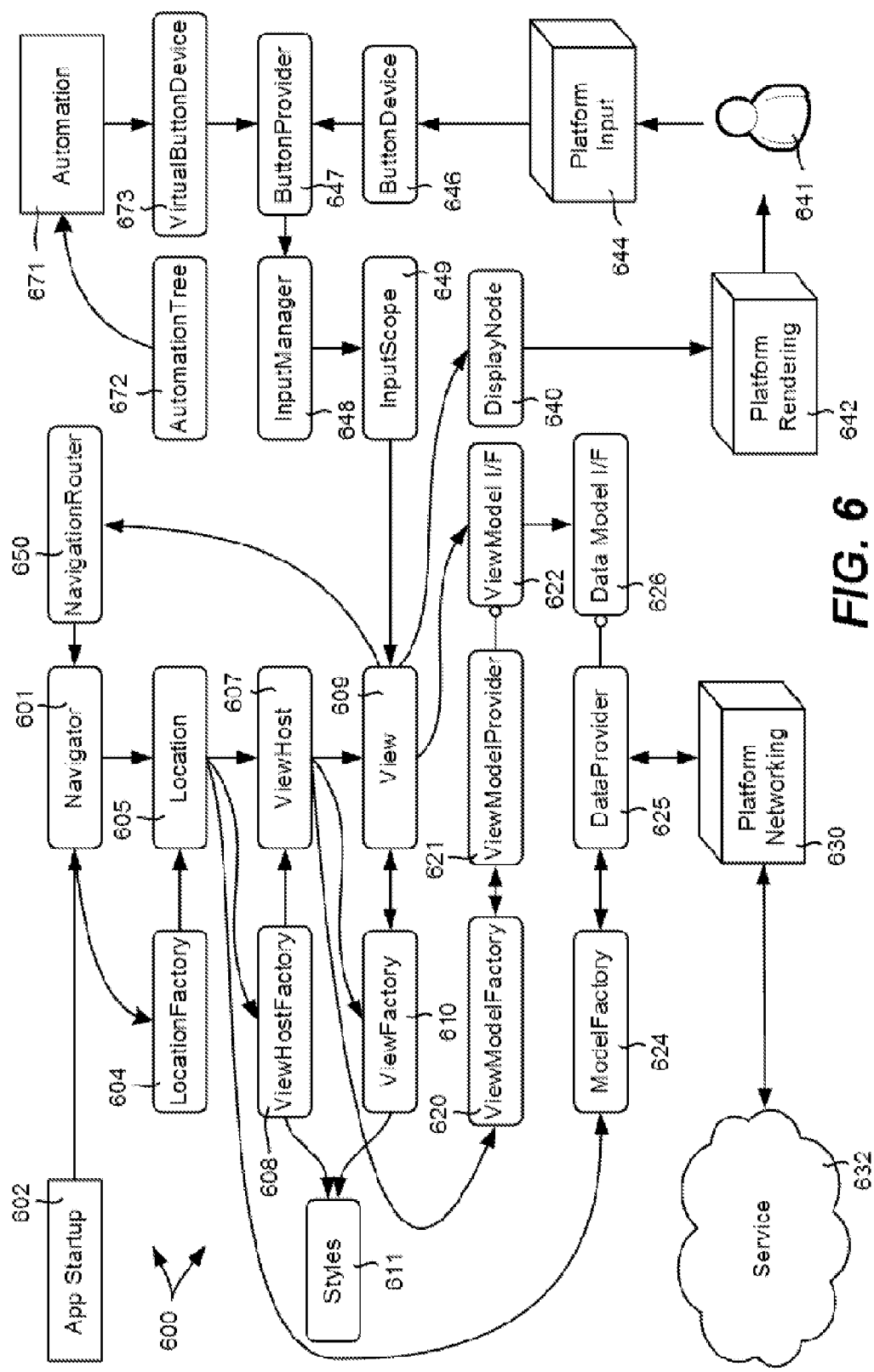
FIG. 6 is an example block diagram representing example components of a platform-independent UI system into which a view, view model and data model may be incorporated, according to one or more example implementations.

Turning to additional details of one example implementation, FIG. 6 shows a number of example components of an environment 600 including a user interface (UI) system that provides the above structure and functionality. The UI system may be used, for example, for any application, including one for playing streaming video, and may be run on top of any underlying device/vendor platform by providing an abstraction layer or the like that transforms the platform-independent input and output to input and output that is appropriate for a particular platform.

In one or more implementations, such as in FIG. 6, a navigator object 601 is called by application startup code 602 to navigate to a root menu (visualized as a View object) corresponding to the startup location, e.g., "RootMenu" (or some representative variable value) is specified as the factory identifier (ID). To obtain this menu, the navigator object 601 calls a location factory 604 for this "RootMenu" location 605, (where in general, a factory is an object that knows how to return an instance of a particular requested object). A view host 607 is created via a ViewHostFactory 608 (called by the location 605) for hosting a view menu 609, in which the view menu 609 in turn is created by a ViewFactory 610. Thus, the view host 607 calls the view factory 610 to return the requested view 609, typically applying a style to the view, (e.g., color scheme, text size, animation and so forth), as specified by a designer of the view 609 from among a set of styles 611, and which also may be based on the factory ID for the particular requested view, which in this example is a menu (or items view). Note that the set of styles may be flattened for each view at loading time, rather than dynamically changing a view's associated style data at runtime.

In one or more implementations, styles are used by the view factory 610 to initialize the created objects' properties. The styles are associated with a factory ID, and can be configured per-client. The view host 607, if visualized, also may have a style applied thereto from the style set 611 via the ViewHostFactory 608.

In typical situations, the view 609 may need view-related data, which in turn may be dependent on data of a (data) model. Thus, a view model factory 620, view model provider 621 implementing a view model interface 622 may be objects called by other objects of the system as represented in FIG. 6; in general, a provider is an object that knows how to retrieve (and if necessary) reformat information corresponding to a model. Similarly, a (data) model factory 624 creates a (data) provider 625 with its implemented data model interface 626. The provider 625 retrieves the needed data, e.g., from platform networking 630 that communicates with one or more services 632; (note that the view model provider 621 converts the data from the data provider 625 format to a format as needed by the view 609).

By way of example, the "RootMenu" view may contain other views, each comprising a button or other interactive component that when selected navigates the user to a different menu. Each of these buttons (views) may be associated with a navigation location (another view) to which the system navigates if that button is pressed. In turn, those other views have an associated data model that specifies its data, which may also include buttons associated with further navigation locations.

To summarize, to navigate to a location, a location factory 604 maps the name of a navigable location into a concrete type of location 605. The location factory 604 allows each client (a program/platform using the factory system) to be configured to have different concrete locations. The view host factory 608 is responsible for creating a view host 607 from a view host factoryId, and applying an appropriate view host style. For a given location, there can be multiple view hosts, e.g., because although different clients may share the same location/data (location), they may look different visually (e.g., a ten foot design versus a tablet design are typically different from each other). Further, for a single client, certain runtime conditions may dictate different views of the same location (e.g., Snap mode vs. Full mode vs. Fill mode are possible modes that determine how a view appears).

The view factory 610 is responsible for creating a view 609 from a view factory ID, and applying an appropriate view style. Note that one difference between a factory ID and a view type is that a single type (e.g., an ItemsView container object) can be used by multiple factory Id configurations, e.g., a list container can contain different menus each having a different factory ID, for example. A difference between a factory ID and an instance is that the system can stamp out multiple instances for the same factory ID. View factory configurations are basically prefabricated configurations of views.

The view model factory 620 is responsible for creating an instance of a view model provider 621 (which implements a view model interface 622) for a factory ID, given a model. The view model factory 620 decides which implementation of a view model interface to use (which view model provider 621).

The (data) model factory 624 is responsible for creating an instance of a provider 625 (which implements a model interface) for a factory ID, given a data ID. The model factory 624 decides which implementation of a model interface to use (which model provider 625). For example, a data provider knows how to retrieve its requested data from the network service 632.

A model may be considered an interface that defines the shape of the data used by the application program, and a provider is an implementation of a model. A model describes what the data is, not where it comes from. Models may have identifiers (IDs), which are used for caching. Creating a model is synchronous, but accessing it (apart from its ID) is asynchronous; e.g., model properties return promises. A data provider knows where to get the data that a model defines, and adapts the data that it gets from its upstream source to the format that the model specifies. There can be multiple different providers for the same model, if there are multiple places to get the data. It is common for providers to make calls out to the platform HTTP stack to request data from a web service, for example.

With respect to views, a View is a primary composable unit of UI, and a view may have one or more child views. A view has an associated DisplayNode (tree) 640 for visualizing the view, (as also generally represented in FIG. 6). Sub-nodes are typically created based on the view model data. The view typically creates/passes a view model derived from its own view model to child views. A view, if invocable, handles user input that is specific to the view. This sometimes results in a navigation via the NavigationRouter 650, e.g., to a different view.

In this way, a container view, such as a menu containing buttons, may navigate via a button selection to other locations. The view is built with child views (such as its buttons or tiles), in which each view becomes a display node 640 in a display node tree. The tree is rendered to a user 641 (via platform rendering 642), whereby the user can interact with the view 609 via platform input 644, e.g., to a button device/button provider 646, 647 that is handled by an input manager 648. Interaction with the view 609 results in a navigation router 650 being invoked to navigate to a new location, e.g., another menu comprising a container view with a set of child views with which a user 641 may interact, and so on, e.g., to provide input 644 and to see a rendering 642 of the display nodes 640.

Note that although FIG. 6 shows a button device 646, other types of input are used in addition to button input. In one or more implementations, this includes pointer input (e.g., via a mouse or touch) and/or command input (e.g., via speech or advanced keyboard keys/key combinations that correspond to commands rather than buttons). In general, the platform input 644 is passed up to the platform-independent level and gets to a view via the input manager 648 and an associated input scope 649. Button input is routed to a view having focus, pointer input is routed to a view based upon hit testing, and command input is routed to a view (or set of views) that meets filtering criteria with respect to handling the type of command received and/or how that command was received (e.g., by speech versus a keyboard key combination).

Also shown in FIG. 6 is the ability for automated input, shown via automation 671, e.g., based upon an automation tree 672 or the like, to act as a virtual button device 673 (or other virtual input device). This may be used in testing, troubleshooting and so forth, for example, including via remote operation.

Among other functionality, the navigator 601 also maintains navigation breadcrumbs (a navigation stack of locations) so that users can navigate to previous locations. More particularly, the navigator 604 in conjunction with the location factory 606 creates locations upon navigation, and when navigating away from a location, the navigator 604 may save the location's state in a breadcrumb.

The Navigation Router 650 is responsible for deciding a location to which to navigate, given a model and some additional context. It is common that a button is associated with some data, and when the button is clicked the system needs to navigate to a location that is determined by the type of data with which the button is associated (bound). This consolidates the logic. Such data-driven navigation provides numerous benefits, including that a change to the data results in a change to the program behavior, without needing to change the code and/or links on a page, for example.

As described herein, a location 605 represents a navigable (and potentially deep-linkable) location in the program code (e.g., application). The location is responsible for getting the data associated with this location, given some navigation arguments, and connecting the location to a ViewHost 607. Note that in one implementation, location does not know anything about the view 609, only the data, that is, the model(s). In general, a location is more portable than ViewHosts; e.g., different designs can be built off the same data.

The ViewHost 607 is responsible for creating the Views that visualize the model(s) provided by a location. The ViewHost 607 registers views that it can create or acquire via handoff. The ViewHost 607 also needs to be able to create a registered view if it is not handed off from the previous ViewHost, and needs to be able to identify and handoff a view if it was already created by the previous ViewHost 607. The ViewHost 607 knows about the intra-view relationships, and thereby is able to handle input data that cross the top-level view boundary.

Figure 7:
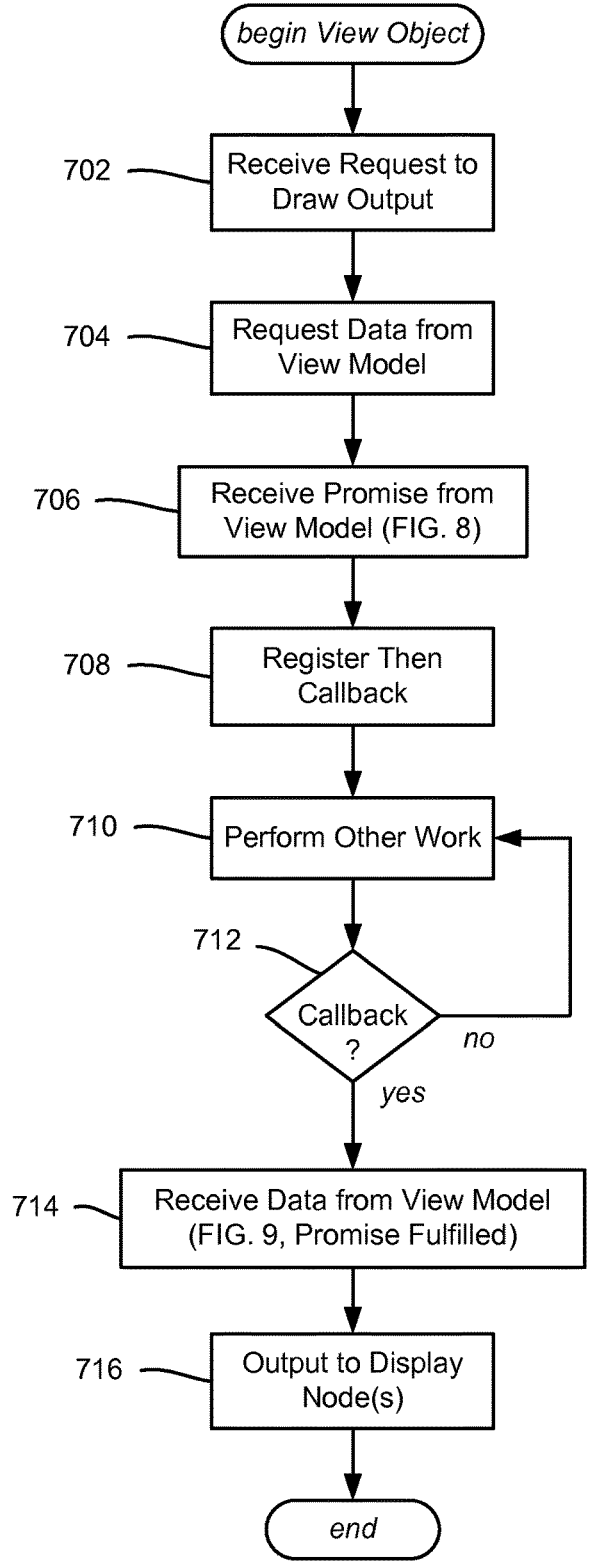
FIG. 7 is a flow diagram showing example steps that may be taken by a view object to make asynchronous requests for view-specified data from a view model and receive the view-specified data in response, according to one or more example implementations.
Figure 8:
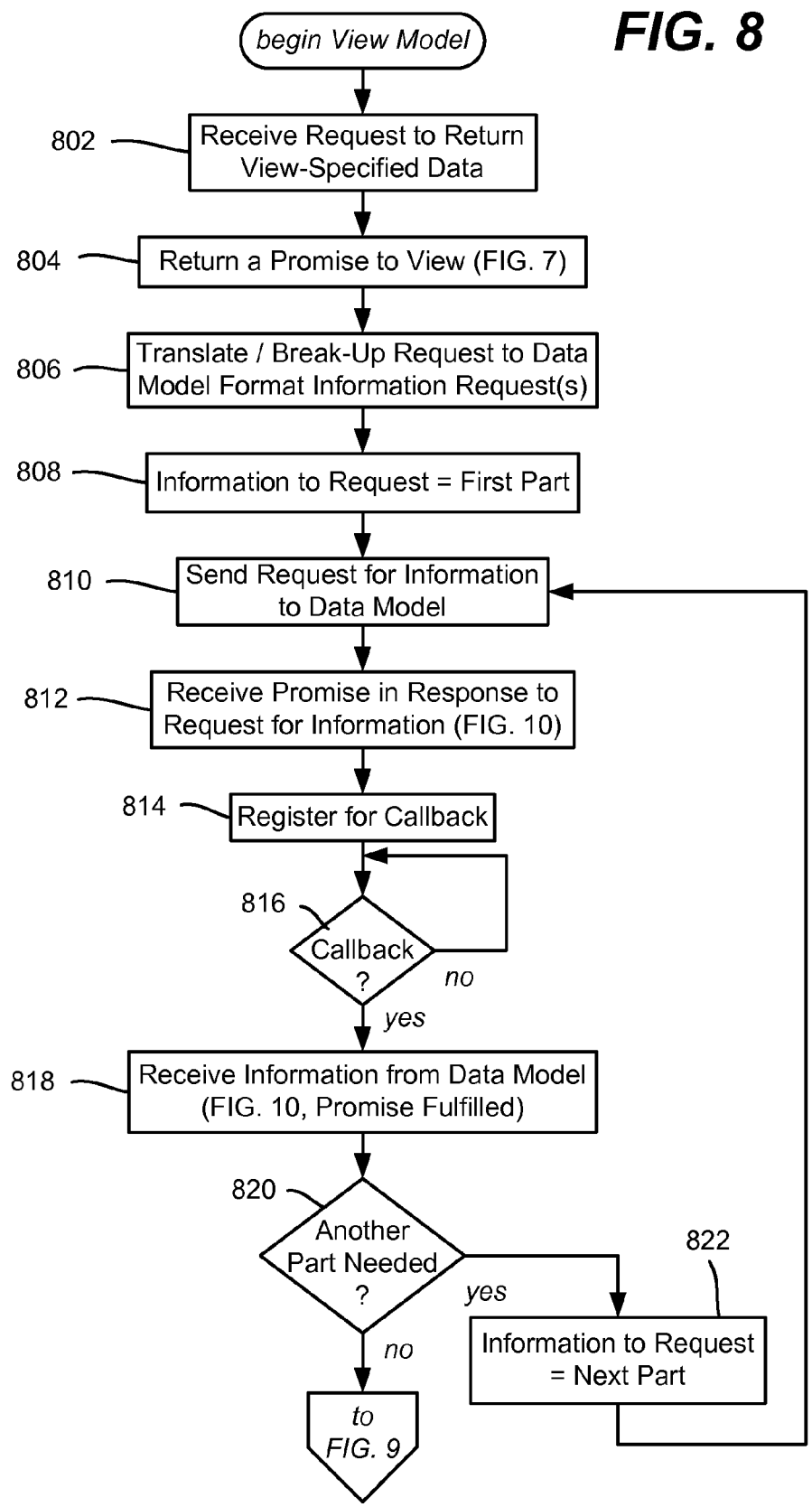
FIGS. 8 and 9 comprise a flow diagram showing example steps that may be taken by a view model to communicate with a view and a data model to return view-specified data to a requesting view, according to one or more example implementations.
Figure 9:
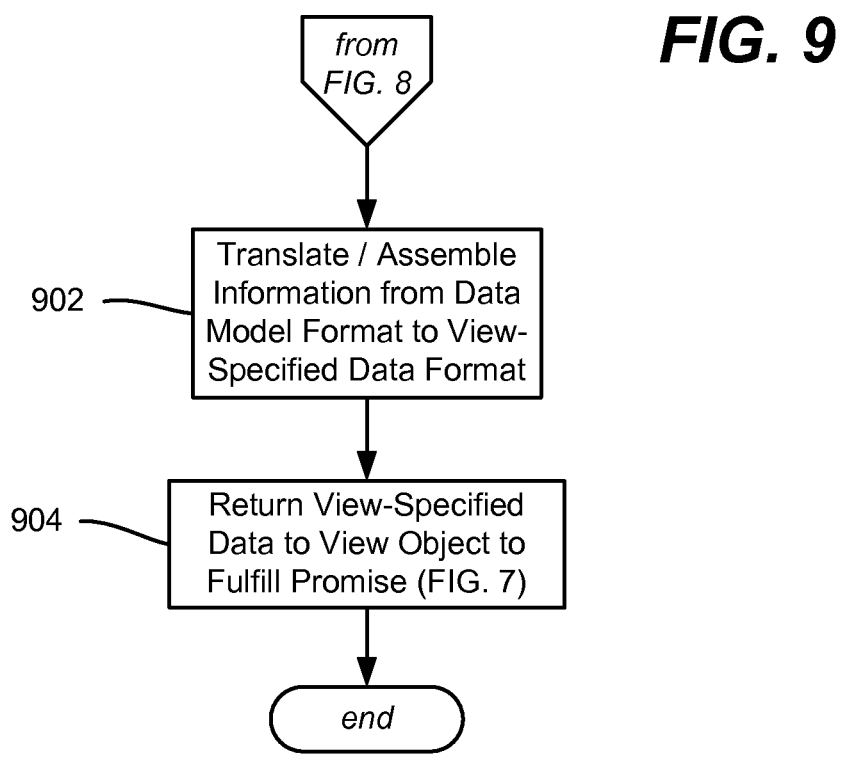
Figure 10:
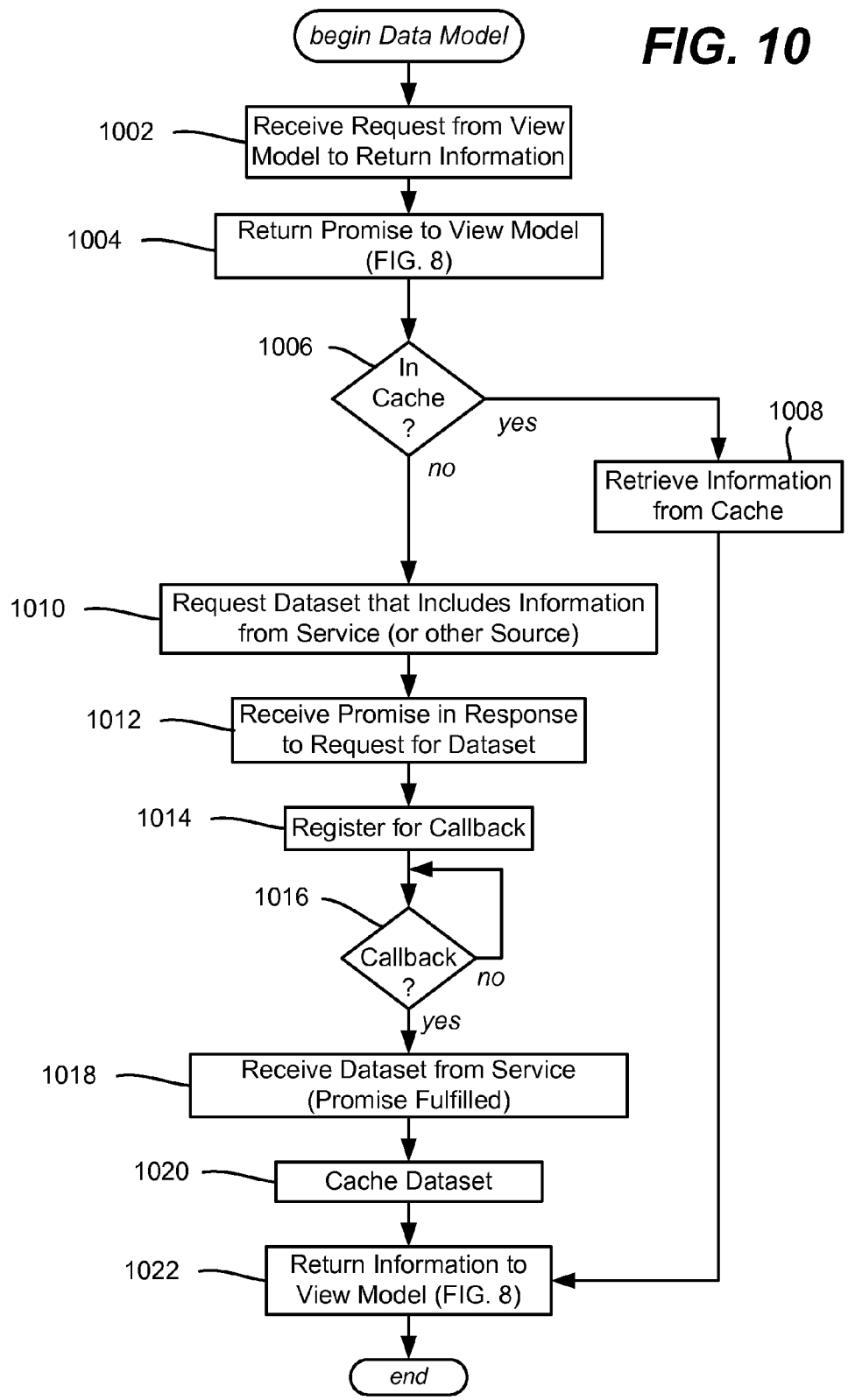
FIG. 10 is a flow diagram showing example steps that may be taken by a data model to obtain data from a data source, comprising a cache and/or network service, to respond to a request from a view model, according to one or more example implementations.

FIG. 7 is a flow diagram showing various example steps from the perspective of a view object. FIGS. 8 and 9 comprise a flow diagram showing various example steps from the perspective of a view model. FIG. 10 is a flow diagram showing various example steps from the perspective of a data model. Note that FIGS. 7-10 assume that the data is returned so that promises are fulfilled, and do not explicitly handle errors, however one or more error handling mechanisms may be built into the application program and it is straightforward for objects to deal with rejected promises.

Step 702 of FIG. 7 represents the view receiving a request to draw some output, e.g., to display node(s) of a display tree. As is understood, the request may be from a parent, e.g., a higher view or possibly the view host. In the example of FIG. 7, the view needs data in order to draw, and thus makes a request to the view's associated view model at step 704.

In this example, the view receives a promise from the view model at step 706, and at step 708 registers for a callback (e.g., a JavaScript® "then" callback or the like") when the data becomes available. While waiting for the data, the view may continue doing other work as represented by step 710; this may include making other data requests to one or more other data providers (e.g., the first request may be for text from one view model, and a second request may be for an image from another view model, or possibly a second request to the same model). Other example work may be to instruct a child view to prepare to draw, so that the child node may begin retrieving any data that the child view will need when it is time for the child view to draw. Note that normally a child view does not actually draw until the parent draws so that the child draws on top of the parent in z-ordering, however it is feasible to have a pre-child view draw some highlighting or the like before the parent view draws so that the pre-child view draws below the parent view.

Another type of work that a view object may perform is to draw itself as a "placeholder" while awaiting (at least some of) its data. For example, consider a user rapidly scrolling or paging through a menu containing a large number of (e.g., 1,000) items, each backed by network data, in which 20 items appear at a time. A view representing an item may draw itself as a placeholder (e.g., a blank or mostly blank rectangle if some data is available) without yet having all or even any of the data needed to fully visualize itself. This allows a user to continue scrolling rapidly to get to some stopping point (e.g., items 481 through 500) without waiting for each full set of data to be received for each item view; once stopped, those item views will fully visualize once the data is received. Pending asynchronous requests may be canceled if the data is no longer needed, e.g. because the user has scrolled beyond those items (although at least some of such data instead may be received and cached in anticipation of a later need for it).

Step 712 represents awaiting the callback, performing any other work via step 710 until the data becomes available. Because the request/callback are asynchronous operations, the view does not block (even in a single-threaded application program) so that the view and other views and their related objects may perform work.

At some later time, at step 714 the view receives the view-specified data from the view model, which fulfills the promise (step 706). Step 716 represents the view outputting its styled visualization of the data to the display node(s) for rendering.

The example view model steps of FIG. 8 begin at step 802 where the view model receives the request from the view for the view-specified data. Step 804 returns a promise from the view model to the view. Note that (as described above with reference to FIG. 5) it is feasible for this step to occur later, e.g., when the view model receives a promise from the data model, however because only one request was received from the view, the view model returns only one promise to the view (even though the view model may break up the request and send multiple property requests to the data model and receive multiple promises in return). Another alternative is to return multiple promises tied to a single request from a view, with the view ignoring all but the first promise It is also feasible that the view model may have its own cache; if so, the requested data may be located therein, however for purposes of this example consider that the view model does not have a cache, or that the requested view-specified data is not cached and thus the data model needs to be called to obtain the information corresponding to the view-specified data being requested.

Step 806 represents the view model translating the request/breaking up the request into the format supported by the data model; (this was exemplified above as translating "text" to "title" in one above example, and breaking "name" into firstName and lastName requests in another above example). Steps 808 and 810 represent sending the first request to the data model for the first part of the information; (note that there may be only one part, but as exemplified with respect to FIG. 5, a view-specified data request may be broken up into multiple requests for parts of the information, e.g., "name" was broken up two parts of needed information, corresponding to "firstName" and "lastName" requests). Indeed, a request may be broken up into multiple parts for sending to two or more different data providers.

Step 812 represents receiving a promise from the data model in response to the request for information. Steps 814 and 816 register and wait for the callback, respectively. At step 818 the promise is fulfilled by the requested information from the data model.

Step 820 and 822 repeat the process for each part of the needed information, until no parts of information remain needed to complete the view-specified data request. When this occurs, the process continues to step 902 of FIG. 9.

Step 902 represents translating and/or assembling the information from the data model into the format needed by the view, e.g., firstName and lastName into a single "name" response, or "title" back to "text" to continue with the above examples. Step 904 returns the response with the view-specified data to fulfill the promise of step 804 of FIG. 8, which corresponds to step 714 of FIG. 7 from the view's perspective.

FIG. 10 represents example operations of the data model, beginning at step 1002 where the data model receives a request from the view model to return information. Step 1004 returns a promise to the view model, because the request is asynchronous. Note that this promise may be returned later, such as upon receiving a promise from the data source.

Step 1006 represents the data model looking for a cached copy of the dataset or the like that contains the desired information, e.g., by an appropriate cache-unique ID. If found, step 1008 obtains the information from the cache, after which it is returned at step 1022. Otherwise, the data model (the provider implementation) needs to obtain the data via an external data source, e.g., a service, whereby step 1010 makes the request.

The service or other data source may return a promise that the data model receives at step 1012. It is also feasible for such a promise to be implicitly created by the data model, (e.g., a data source may be some entity that does not create promises but simply returns data), because the data model knows it is making a network request for a dataset, which is relatively slow. In any event, steps 1014 and 1016 await the dataset from the data source, which may be a formal callback or some other communication, however the request is asynchronous/does not block whereby other application work may be done.

Step 1018 receives the data set, and the promise (explicit or implicit) is fulfilled. Step 1020 caches the dataset with an appropriative ID. The requested information from the dataset is returned to the view model at step 1022; note that this may only be part of the needed information, and the view model may again request another part of the information in a subsequent call, whereby the steps of FIG. 10 are repeated (with the dataset likely cached with the information requested on the subsequent request or requests).

It should be noted that although everything remains asynchronous in one or more implementations, the data model (or similarly the view model) need not return a promise if the requested information is cached and it is more efficient to return the information directly, rather than return a promise followed by the information. For example, if the information is in a RAM cache, then it is likely more efficient to return the information from the RAM cache directly, rather than to return a promise, fetch the information (relatively very quickly) from the RAM cache, and return the information to fulfill the promise; thus step 1004 of FIG. 10 may come after step 1006 in such a situation so that a promise is not returned for cached data, with step 812 of FIG. 8 receiving the cached data instead of a promise and skipping ahead to step 820. Also, it is feasible for the promise from the view model to the view (step 804 of FIG. 8) to be sent only if the view model receives a promise from the data model instead of the requested information/part of the information.

However, there are various types of cache media, and thus it may not always be more efficient to skip the promise/fulfillment mechanism. For example, if the data model's cache is in virtual memory it may be cached but backed by a hard drive or flash memory rather than in RAM when needed, whereby retrieval may be slow enough to adversely impact the overall application program process relative to using a promise/fulfillment mechanism or the like. If attempting to bypass the promise/fulfillment mechanism with directly accessed information, consideration needs to be given to how efficient access to that cached information actually is.

As can be seen, described are asynchronous models for an application program/UI system. A view layer is distinct from a data layer, with views having view models associated with the views coupled to data models associated with data sources, providing a number of benefits. The asynchronous operations allow a model to be initially created with all, none, or some of its data, while views can be created and function to a large extent even when those views depend on data that an application program does not yet have.

One or more aspects are directed towards receiving, at a view model, a request from a view for view-specified data, and at the view model, making one or more asynchronous requests to a data model for information corresponding to the view-specified data. Described herein is returning a promise from the view model to the view in response to the request for the view-specified data, and obtaining a dataset including the information at the data model. The information is provided from the data model to the view model in response to the one or more asynchronous requests, and the view-specified data returned, based upon the information returned to the view model, from the view model to the view to fulfill the promise.

A promise from the data model to the view model may be returned in response to the request for the information. Note that the view may be created via a view factory, the view model may be created via a view model factory and the data model may be created via a data model factory.

Obtaining the dataset may include communicating with a data source, returning a promise from the data model to the view model, receiving the dataset from the data source, and returning at least part of the information from the data model to the view model to fulfill the promise. A promise from the data source may be received at the data model. Obtaining the dataset including the information at the data model may include accessing the dataset in a cache coupled to the data model.

At least part of the dataset received from the data source may be cached in a cache coupled to the data model. Upon receiving another request at the data model for requested information, the data model may determine that the requested information is in the cache, and return the information from the cache in response to the other request.

Making the one or more asynchronous requests to the data model for information corresponding to the view-specified data may include making at least two separate requests for different parts of the information. At the data model at least part of the dataset may be cached in a data model cache, whereby providing the information from the data model to the view model in response to the one or more asynchronous requests may include providing a first part of the information from the data source in response to one request, and providing another other part of the information from the cache in response to another request.

One or more aspects are directed towards a view model comprising a view model interface and a view model provider, the view model configured to be coupled to a view object via the view model interface, along with a data model comprising a data model interface and a data model provider. The view model is configured to be coupled to the data model via the data model interface, and is configured to receive a request for view-specified data from the view object. The view model provider asynchronously request information corresponding to the view-specified data from the data model, with the data model provider configured to obtain a dataset including the information from a data source and return the information to the view model. The view model returns a response comprising the view-specified data to the view object based upon the information.

The view model provider may break up the request for the view-specified data into a plurality of asynchronous requests to the data model for parts of the information. The view model provider may reassemble the parts of the information received from the data model into the response comprising the view-specified data to the view object. The view model provider may translate the information received from the data model into the response into a data format corresponding to the view-specified data for returning to the view object. The view model may return a promise to the view object, and later return the response comprising the view-specified data to the view object to fulfill the promise.

The data source may comprise a web service. The data source may comprise a cache, and the data model may retrieve the information from the cache.

One or more aspects are directed towards receiving, at a view model, a request from a view for view-specified data, returning a first promise from the view model to the view and making an asynchronous request to a data model for information corresponding to the view-specified data. A second promise from the data model to the view model is received. The data model makes an asynchronous request to a data source for a data corresponding to the information, and obtains the dataset in response to the request to the data source at the data model, in which the dataset includes the information. Described herein is returning the information from the data model to the view model to fulfill the second promise, and returning the view-specified data, based upon the information returned to the view model, from the view model to the view to fulfill the first promise. A third promise from the data source to the data model may be received, whereby obtaining the dataset in response to the request to the data source at the data model fulfills the third promise.

At the view model, the information from the data model may be processed into a format corresponding to the view-specified data. The asynchronous request to the data model for information corresponding to the view-specified data may be part of a plurality of requests, and at least one other asynchronous request may be made to the data model for other information corresponding to the view-specified data.

Example Computing Device

The techniques described herein can be applied to any device or set of devices (machines) capable of running programs and processes. It can be understood, therefore, that personal computers, laptops, handheld, portable and other computing devices and computing objects of all kinds including cell phones, tablet/slate computers, gaming/entertainment consoles and the like are contemplated for use in connection with various implementations including those exemplified herein. Accordingly, the general purpose computing mechanism described below in FIG. 11 is but one example of a computing device.

Implementations can partly be implemented via an operating system, for use by a developer of services for a device or object, and/or included within application software that operates to perform one or more functional aspects of the various implementations described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 11:
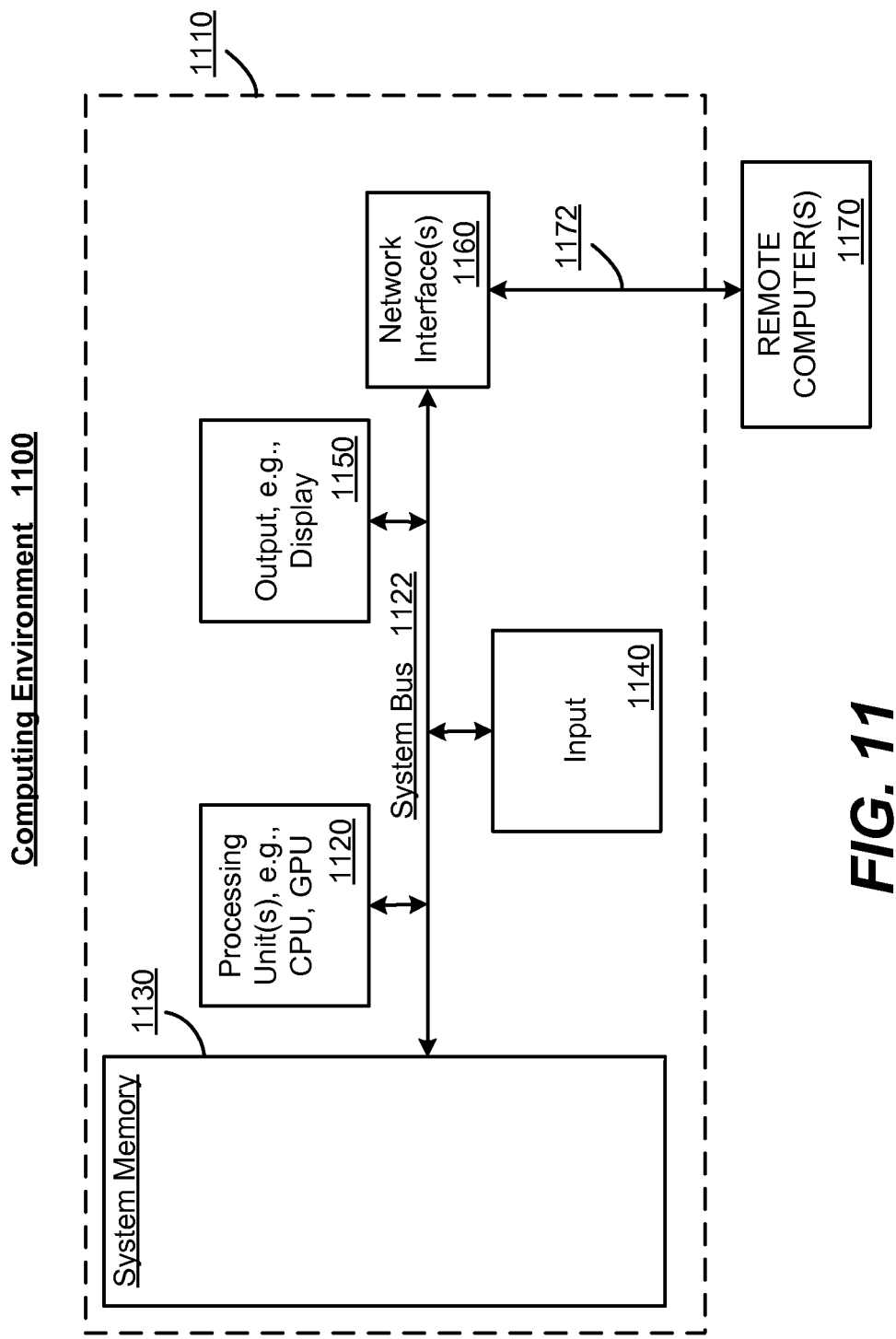
FIG. 11 is a block diagram representing an example computing environment into which aspects of the subject matter described herein may be incorporated.

FIG. 11 thus illustrates an example of a suitable computing system environment 1100 in which one or aspects of the implementations described herein can be implemented, although as made clear above, the computing system environment 1100 is only one example of a suitable computing environment and is not intended to suggest any limitation as to scope of use or functionality. In addition, the computing system environment 1100 is not intended to be interpreted as having any dependency relating to any one or combination of components illustrated in the example computing system environment 1100.

With reference to FIG. 11, an example device for implementing one or more implementations includes a general purpose computing device in the form of a computer 1110. Components of computer 1110 may include, but are not limited to, a processing unit 1120, a system memory 1130, and a system bus 1122 that couples various system components including the system memory to the processing unit 1120.

Computer 1110 typically includes a variety of machine (e.g., computer) readable media and can be any available media that can be accessed by a machine such as the computer 1110. The system memory 1130 may include computer storage media in the form of volatile and/or nonvolatile memory such as read only memory (ROM) and/or random access memory (RAM), and hard drive media, optical storage media, flash media, and so forth; as used herein, machine readable/computer readable storage media stores data that does not include transitory signals, (although other types of machine readable/computer readable media that is not storage media may). By way of example, and not limitation, system memory 1130 may also include an operating system, application programs, other program modules, and program data.

A user can enter commands and information into the computer 1110 through one or more input devices 1140. A monitor or other type of display device is also connected to the system bus 1122 via an interface, such as output interface 1150. In addition to a monitor, computers can also include other peripheral output devices such as speakers and a printer, which may be connected through output interface 1150.

The computer 1110 may operate in a networked or distributed environment using logical connections to one or more other remote computers, such as remote computer 1170. The remote computer 1170 may be a personal computer, a server, a router, a network PC, a peer device or other common network node, or any other remote media consumption or transmission device, and may include any or all of the elements described above relative to the computer 1110. The logical connections depicted in FIG. 11 include a network 1172, such as a local area network (LAN) or a wide area network (WAN), but may also include other networks/buses. Such networking environments are commonplace in homes, offices, enterprise-wide computer networks, intranets and the Internet.

As mentioned above, while example implementations have been described in connection with various computing devices and network architectures, the underlying concepts may be applied to any network system and any computing device or system in which it is desirable to implement such technology.

Also, there are multiple ways to implement the same or similar functionality, e.g., an appropriate API, tool kit, driver code, operating system, control, standalone or downloadable software object, etc., which enables applications and services to take advantage of the techniques provided herein. Thus, implementations herein are contemplated from the standpoint of an API (or other software object), as well as from a software or hardware object that implements one or more implementations as described herein. Thus, various implementations described herein can have aspects that are wholly in hardware, partly in hardware and partly in software, as well as wholly in software.

The word "example" is used herein to mean serving as an example, instance, or illustration. For the avoidance of doubt, the subject matter disclosed herein is not limited by such examples. In addition, any aspect or design described herein as "example" is not necessarily to be construed as preferred or advantageous over other aspects or designs, nor is it meant to preclude equivalent example structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts/flow diagrams of the various figures. While for purposes of simplicity of explanation, the methodologies are shown and described as a series of blocks, it is to be understood and appreciated that the various implementations are not limited by the order of the blocks, as some blocks may occur in different orders and/or concurrently with other blocks from what is depicted and described herein. Where non-sequential, or branched, flow is illustrated via flowcharts/flow diagrams, it can be appreciated that various other branches, flow paths, and orders of the blocks, may be implemented which achieve the same or a similar result. Moreover, some illustrated blocks are optional in implementing the methodologies described herein.

CONCLUSION

While the invention is susceptible to various modifications and alternative constructions, certain illustrated implementations thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A method, comprising:
communicating, by a device comprising a processor via a view to a view model, a request for view-specified data associated with the view;
receiving, by the device via the view model, the request for the view-specified data;
making, by the device via the view model, one or more asynchronous requests to a data model for information corresponding to the view-specified data;
communicating, by the device via the view model, a first promise to the view to provide the view-specified data in response to the request for the view-specified data;
registering, by the device via the view, a callback for rendering the view upon receipt of the view-specified data;
performing, by the device via the view, prior to the view receiving the view-specified data, a task related to the rendering the view;
obtaining, by the device via the data model, a dataset including the information;
providing, by the device via the data model, the information to the view model in response to the one or more asynchronous requests; and
communicating, by the device via the view model, the view-specified data, based upon the information returned to the view model, from the view model to the view to fulfill the first promise.

2. The method of claim 1, wherein the obtaining the dataset including the information at the data model comprises communicating with a data source connected to the device over a network, and further comprising, communicating a second promise from the data model to the view model, receiving the dataset from the data source, and communicating at least part of the information from the data model to the view model to fulfill the second promise from the data model to the view model.

3. The method of claim 2, further comprising, receiving, by the device via the data model, a third promise from the data source at the data model.

4. The method of claim 2, further comprising, caching, by the device via the data model, at least part of the dataset received from the data source in a cache coupled to the data model.

5. The method of claim 4, further comprising, receiving, by the device via the data model, another request for requested information, determining, by the device via the data model, that the requested information is in the cache, and returning, by the device via the data model, the information from the cache in response to the other request.

6. The method of claim 1, wherein the making the one or more asynchronous requests to the data model for information corresponding to the view-specified data comprises making at least two separate asynchronous requests for different parts of the information.

7. The method of claim 6, further comprising caching, by the device via the data model, at least part of the dataset in a data model cache, and wherein providing the information from the data model to the view model in response to the one or more asynchronous requests comprises providing a first part of the information from the data source in response to a first asynchronous request of the one or more asynchronous requests, and providing another part of the information from the cache in response to a second asynchronous request of the one or more asynchronous requests.

8. The method of claim 1, wherein the task related to rendering the view comprises communicating, by the device via the view to another view model, another request for other view-specified data.

9. The method of claim 1, further comprising, communicating, by the device via the data model, a second promise from the data model to the view model in response to the one or more asynchronous requests for the information.

10. The method of claim 1, wherein the task related to rendering the view comprises instructing, by the device via the view, a child view of the view to render at least a portion of the child view on a display of the device.

11. A system comprising:
a processor; and
a memory communicatively coupled to the processor, the memory having stored therein computer-executable components, comprising:
a view model configured to be coupled to a view object;
a data model configured to be coupled to the view model; and
wherein the view model is further configured to receive a request for view-specified data from the view object, asynchronously request information corresponding to the view-specified data from the data model, and communicate a first promise from the view model to the view to provide the view-specified data in response to the request;
wherein the view object is configured to:
register a callback for rendering the view object upon receipt of the view-specified data,
perform, prior to the view receiving the view-specified data, a task related to the rendering the view object;
wherein the data model is further configured to obtain a dataset including the information from a data source external to the system, and return the information to the view model; and
wherein the view model is further configured to communicate a response comprising the view-specified data to the view object based upon the information to fulfill the first promise.

12. The system of claim 11, wherein the task related to rendering the view object comprises communicating, by the view object to another view model, another request for other view-specified data.

13. The system of claim 11, wherein the task related to rendering the view object comprises instructing, by the view object, a child view object of the view object to render at least a portion of a child view object on a display device.

14. The system of claim 13, wherein the view object is further configured to, in response to receiving the view-specified data, render the view object over the child view object on the display device.

15. The system of claim 11, wherein the task related to rendering the view object comprises rendering, by the view object, at least a portion of the view object without the view-specified data on a display device.

16. The system of claim 15, wherein the view object is further configured to, in response to receiving the view-specified data, render the view-specified data in the rendered at least the portion of the view object on the display device.

17. A non-transitory computer-readable medium having instructions stored thereon that, in response to execution, cause a device including a processor to perform operations comprising:
- communicating, via a view to a view model, a request for view-specified data associated with the view;
- receiving, at the view model, the request for the view-specified data;
- returning, by the view model, a first promise to the view to provide the view-specified data;
- registering, via the view, a callback for rendering the view upon receipt of the view-specified data;
- performing, via the view, prior to the view receiving the view-specified data, a task related to the rendering the view;
- making, via the view model, an asynchronous request to a data model for information corresponding to the view-specified data;
- receiving, via the view model, a second promise from the data model to provide the information;
- making, via the data model, an asynchronous request to a data source external to the device for a dataset corresponding to the information;
- obtaining, via the data model, the dataset in response to the request to the data source, the dataset including the information;
- returning, via the data model, the information to the view model to fulfill the second promise; and
- returning, via the view model, the view-specified data based upon the information returned to the view model, to the view to fulfill the first promise.

18. The non-transitory computer-readable medium of claim 17, wherein the task related to rendering the view comprises communicating, by the device via the view to another view model, another request for other view-specified data.

19. The non-transitory computer-readable medium of claim 17, wherein the task related to rendering the view comprises instructing, via the view, a child view of the view to render at least a portion of the child view on a display of the device.

20. The non-transitory computer-readable medium of claim 17, wherein the task related to rendering the view comprises rendering, via the view, at least a portion of the view without the view-specified data on a display of the device.

* * * * *